US011061882B2

(12) United States Patent
Liu et al.

(10) Patent No.: US 11,061,882 B2
(45) Date of Patent: Jul. 13, 2021

(54) SYSTEMS AND METHODS FOR GENERATING A WIDE TABLE

(71) Applicant: BEIJING DIDI INFINITY TECHNOLOGY AND DEVELOPMENT CO., LTD., Beijing (CN)

(72) Inventors: Shu Liu, Hangzhou (CN); Longzhi Du, Beijing (CN); Junqiang Fu, Beijing (CN); Long He, Beijing (CN); Zhiming Wang, Beijing (CN); Yufeng Fan, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/930,344

(22) Filed: Jul. 16, 2020

(65) Prior Publication Data
US 2020/0349141 A1 Nov. 5, 2020

Related U.S. Application Data

(63) Continuation of application No. PCT/CN2018/092579, filed on Jun. 25, 2018.

(51) Int. Cl.
*G06F 16/22* (2019.01)
*G06F 16/28* (2019.01)

(52) U.S. Cl.
CPC ...... *G06F 16/2282* (2019.01); *G06F 16/2264* (2019.01); *G06F 16/283* (2019.01); *G06F 16/288* (2019.01)

(58) Field of Classification Search
CPC .. G06F 16/2282; G06F 16/288; G06F 16/283; G06F 16/2264
(Continued)

(56) References Cited

U.S. PATENT DOCUMENTS 7,707,145 B2 * 4/2010 Mischke ................. G06F 16/21
707/999.003
8,301,755 B2 * 10/2012 De Peuter .............. G06Q 10/10
709/224
(Continued)

FOREIGN PATENT DOCUMENTS

CN 101661491 A 3/2010
CN 101799807 A 8/2010
(Continued)

OTHER PUBLICATIONS

Han, Shouzhong et al., Performance Optimizing Methods of Data Warehouse about Banking, Computer Technology and Development, 16(4), 2006, 4 pages.
(Continued)

*Primary Examiner* — Mark E Hershley
(74) *Attorney, Agent, or Firm* — Metis IP LLC

(57) ABSTRACT

The present disclosure relates to a system, method and non-transitory computer readable medium. The system includes at least one computer-readable storage medium including a set of instructions and at least one processor in communication with the at least one computer-readable storage medium. When executing the set of instructions, the at least one processor is directed to: obtain a plurality of sub-tables, each being associated with one or more fields of a target wide table; generate a plurality of intermediate tables, each being directly or indirectly based on one or more of the plurality of sub-tables, wherein at least two of the plurality of intermediate tables are generated in parallel; and determine the target wide table based on the plurality of intermediate tables.

20 Claims, 6 Drawing Sheets

(58) Field of Classification Search
USPC .......................................................... 707/741
See application file for complete search history.

(56) References Cited

U.S. PATENT DOCUMENTS

| | | | |
|---|---|---|---|
| 8,751,460 B1* | 6/2014 | Annapragada | G06F 16/951 707/684 |
| 8,768,959 B1* | 7/2014 | Annapragada | G06F 16/284 707/770 |
| 2004/0049574 A1* | 3/2004 | Watson | G06F 16/9577 709/224 |
| 2004/0136407 A1* | 7/2004 | Okamoto | H04L 45/742 370/506 |
| 2004/0205058 A1* | 10/2004 | Kiji | G06Q 10/10 |
| 2007/0192695 A1* | 8/2007 | Grotjohn | G06F 3/0483 715/713 |
| 2008/0195428 A1* | 8/2008 | O'Sullivan | G06Q 10/00 705/6 |
| 2008/0256111 A1* | 10/2008 | Haham | G06F 11/3664 |
| 2009/0248587 A1* | 10/2009 | Van Buskirk | G06Q 10/063112 705/80 |
| 2010/0049766 A1* | 2/2010 | Sweeney | G06N 5/02 707/737 |
| 2011/0163968 A1* | 7/2011 | Hogan | G06F 3/0488 345/173 |
| 2015/0017995 A1* | 1/2015 | Wirola | H04W 4/029 455/446 |
| 2015/0302058 A1* | 10/2015 | Li | G06F 16/284 707/714 |
| 2015/0363478 A1* | 12/2015 | Haynes | G06F 16/26 707/625 |
| 2017/0167882 A1* | 6/2017 | Ulloa Paredes | G01C 21/3492 |
| 2017/0228683 A1* | 8/2017 | Hu | G08G 1/00 |
| 2017/0315978 A1* | 11/2017 | Boucher | G06F 40/106 |
| 2018/0025407 A1* | 1/2018 | Zhang | G06Q 30/0635 705/26.81 |
| 2018/0032964 A1* | 2/2018 | Gkiotsalitis | G08G 1/127 |
| 2018/0276586 A1* | 9/2018 | Treasure | G06Q 10/0633 |
| 2018/0276780 A1* | 9/2018 | Akande | G06Q 50/30 |
| 2019/0172170 A1* | 6/2019 | Jabour | G06Q 30/0645 |
| 2019/0266275 A1* | 8/2019 | Wernze | G06F 16/24539 |
| 2019/0266815 A1* | 8/2019 | Andrade | G07C 5/0841 |

FOREIGN PATENT DOCUMENTS

| | | |
|---|---|---|
| CN | 101692208 B | 3/2011 |
| CN | 103136244 A | 6/2013 |
| CN | 102681901 B | 4/2014 |
| CN | 103853838 A | 6/2014 |
| CN | 104463754 A | 3/2015 |
| CN | 105068863 A | 11/2015 |
| CN | 106033473 A | 10/2016 |
| CN | 106326248 A | 1/2017 |
| CN | 106815071 A | 6/2017 |
| CN | 107330045 A | 11/2017 |
| JP | H03122722 A | 5/1991 |

OTHER PUBLICATIONS

Liu, Yongge et al., Intermediate table mechanism of complex object query in ORDBMS, Computer Applications, 21(6): 73-75, 2001.
Fu, Huaiguo et al., A Parallel Algorithm to Generate Formal Concepts for Large Data, International Conference on Formal Concept Analysis, International Conference on Formal Conference Analysis, 394-401, 2004.
First Office Action in Chinese Application No. 201880001326.2 dated May 18, 2020, 10 pages.
International Search Report in PCT/CN2018/092579 dated Mar. 28, 2019, 4 pages.
Written Opinion in PCT/CN2018/092579 dated Mar. 28, 2019, 3 pages.

* cited by examiner

SYSTEMS AND METHODS FOR GENERATING A WIDE TABLE

CROSS-REFERENCE TO RELATED APPLICATIONS

This application is a Continuation of International Application No. PCT/CN2018/092579, filed on Jun. 25, 2018, the entire contents of which are hereby incorporated by reference.

TECHNICAL FIELD

The present disclosure generally relates to a system and method for generating a wide table, and in particular, to a system and method for efficiently generating a wide table based on a plurality of sub-tables.

BACKGROUND

With the development of the information age, storing and managing information effectively is becoming more and more important. As a form of storing and managing information, wide tables are a used prevalently. However, it is sometimes time-consuming and inconvenient to generate a wide table for the storage and management of a large amount of data using existing technology. Therefore, it is necessary to generate and/or manage a wide table with more efficiency.

SUMMARY

According to an aspect of the present disclosure, a system for generating a wide table may include at least one storage device including a set of instructions; and at least one processor in communication with the at least one storage device. When executing the set of instructions, the at least one processor is configured to cause the system to obtain a plurality of sub-tables, each being associated with one or more fields of a target wide table; generate a plurality of intermediate tables, each being directly or indirectly based on one or more of the plurality of sub-tables, wherein at least two of the plurality of intermediate tables are generated in parallel, and at least one intermediate table is generated before one or more of the sub-tables are obtained; and determine the target wide table based on the plurality of intermediate tables.

In some embodiments, the plurality of sub-tables, the plurality of intermediate tables, and the target wide table may form a multi-level structure.

In some embodiments, the multi-level structure may be determined with: (a) relationships among the plurality of sub-tables and the plurality of intermediate tables; (b) relationships among the generation time points of the plurality of sub-tables and the plurality of intermediate tables; or (c) a combination of (a) and (b).

In some embodiments, the multi-level structure may include one or more intermediate layers corresponding to the plurality of intermediate tables and a base layer corresponding to the plurality of sub-tables. One of the plurality of intermediate tables may be generated based on: at least two intermediate tables at a same lower intermediate layer or two different lower intermediate layers, at least one intermediate table at a lower intermediate layer and at least one sub-table at the base layer, or at least two sub-tables at the base layer.

In some embodiments, time differences among the generation time points corresponding to the at least two intermediate tables at the same lower intermediate layer or two different lower intermediate layers, time differences among the at least one intermediate table at the lower intermediate layer and the at least one sub-table at the base layer, or time differences among the at least two sub-tables at the base layer may be less than a threshold.

In some embodiments, the relationships among the at least two intermediate tables at the same lower intermediate layer or two different lower intermediate layers, the relationships among the at least one intermediate table at the lower intermediate layer and the at least one sub-table at the base layer, or the relationships among the at least two sub-tables at the base layer may be associated with at least one field of the plurality of fields of the target wide table.

In some embodiments, to generate the plurality of intermediate tables, the at least one processor may be further configured to cause the system to combine the at least two intermediate tables at the same lower intermediate layer or two different lower intermediate layers, the at least one intermediate table at the lower intermediate layer and the at least one sub-table at the base layer, or at least two sub-tables at the base layer.

In some embodiments, to generate the at least one intermediate table, the at least one processor is further configured to cause the system to: process information associated with the at least two intermediate tables at the same lower intermediate layer or two different lower intermediate layers, the at least one intermediate table at the lower intermediate layer and the at least one sub-table at the base layer, or at least two sub-tables at the base layer.

According to an aspect of the present disclosure, a method for generating a wide table implemented on a computing device having at least one processor, at least one computer-readable storage medium, and a communication platform connected to a network may include obtaining a plurality of sub-tables, each being associated with one or more fields of a target wide table; generating a plurality of intermediate tables, each being directly or indirectly based on one or more of the plurality of sub-tables, wherein at least two of the plurality of intermediate tables are generated in parallel, and at least one intermediate table is generated before one or more of the sub-tables are obtained; and determining the target wide table based on the plurality of intermediate tables.

According to an aspect of the present disclosure, a non-transitory computer readable medium may include instructions configured to cause a computing system to obtain a plurality of sub-tables, each being associated with one or more fields of a target wide table; generate a plurality of intermediate tables, each being directly or indirectly based on one or more of the plurality of sub-tables, wherein at least two of the plurality of intermediate tables are generated in parallel, and at least one intermediate table is generated before one or more of the sub-tables are obtained; and determine the target wide table based on the plurality of intermediate tables.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
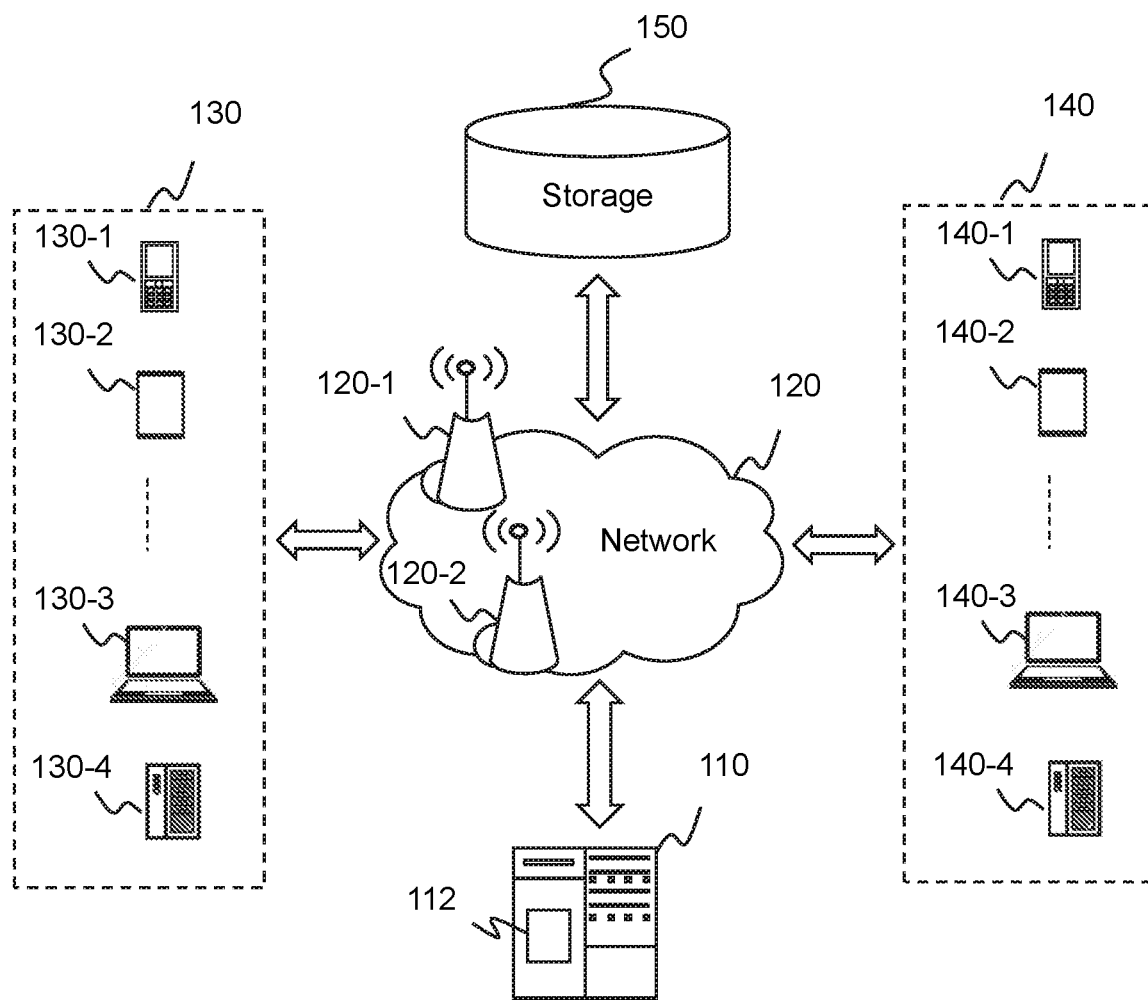
FIG. 1 illustrates an exemplary on-demand service system of providing an on-demand service, according to some embodiments.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

In some embodiments, the present invention may be used in all types of applications in which a wide table is employed. In some embodiments, the present invention may be used to improve the efficiency and effectiveness of an on-line service. In some embodiments, the present invention my be used to improve the efficiency and effectiveness of an on-line on-demand service. Some embodiments of the present invention involve an on-line on-demand service for taxi hailing and/or car-sharing.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for purposes of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The terms "passenger," "requestor," "service requestor," and "user" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The terms "service request," "request for a service," "requests," "order," and "service order" in the present disclosure are used interchangeably to refer to a request that may be initiated by a passenger, a service requestor, a user, a driver, a provider, a service provider, or the like, or any combination thereof. The service request may be accepted by any one of a passenger, a service requestor, a user, a driver, a provider, or a service provider. The service request may be chargeable or free.

The term "service provider terminal" in the present disclosure is used to refer to a mobile terminal that is used by a service provider to provide a service or facilitate the providing of the service. The term "user terminal" in the present disclosure is used to refer to a mobile terminal that is used by a service requestor to request or order a service.

It will be understood that, while the system and method in the present disclosure are described primarily in regard to generating a wide table of information associated with a transportation service, it should also be understood that the present disclosure is not intended to be limiting. The system or method of the present disclosure may be applied to various kinds of service, business, management, etc. In some embodiments, the service, business, and management may relate to food, medicine, commodity, chemical product, electrical appliance, clothing, car, housing, luxury, or the like, or any combination thereof. In some other embodiments, the service, business, and management may relate to finance, education, internet, or the like, or any combination thereof. More particularly, for example, the system or method of the present disclosure may be applied to search engines, digital map applications, navigation systems, etc. The search engines, digital map applications, or navigation systems may use the system and the method provided herein to store and manage information. As another example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management, for example, a system for sending and/or receiving an express.

Moreover, a system and method for generating a target wide table associated with a plurality of sub-tables are provided. To be specific, the system may obtain a plurality of sub-tables associated with a plurality of fields of a target wide table. Then, the system may generate a plurality of intermediate tables based on the plurality of sub-tables. At least two of the plurality of intermediate tables are generated in parallel. Further, the system may determine the target wide table based on the plurality of intermediate tables. Thus, the efficiency of storing and managing information is enhanced.

FIG. 1 illustrates an exemplary on-demand service system of providing an on-demand service according to some embodiments. An on-demand service system 100 may be an online transportation service platform implemented in a network environment for providing transportation services. The on-demand service system 100 may include a server 110, a network 120, a user terminal 130, a service provider terminal 140, and a storage 150.

The on-demand service system 100 may provide a plurality of on-demand services. Exemplary on-demand service may include a taxi hailing service, a chauffeur service, an express car service, a carpool service, a bus service, a driver hire service, and a shuttle service. In some embodiments, an on-demand service may be provided with supplementary information (e.g., an order type) recommended to perform the on-demand service. The order type may include a taxi order, a luxury car order, an express car order, a bus order, a shuttle order, etc. In some embodiments, an on-demand service may be any on-line service, such as booking a meal, shopping, or the like, or a combination thereof.

The server 110 may be a computer server. The server 110 may communicate with the user terminal 130 and/or the service provider terminal 140 to provide various functions of an online on-demand service. In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120.

In some embodiments, the server 110 may access information and/or data stored in the user terminal 130, the service provider terminal 140, and/or the storage 150 via the network 120. For example, the server 110 may access information associated with historical orders stored in a plurality of user terminals 130. As another example, the server 110 may access a plurality of sub-tables associated with a plurality of historical orders stored in the storage 150. In some embodiments, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to performing one or more functions described in the present disclosure. For example, the processing engine 112 may determine time differences among the generation time points of a plurality of tables and/or relationships among the plurality of tables. As used here, the term "relationship" refers to logical, mathematical, or statistical links between various tables, such as but not limited to shared fields (e.g., all including order number), related fields (e.g. travel time and travel distance), etc. A table may include a sub-table and/or an intermediate table illustrated below. As another example, the processing engine 112 may generate a target wide table according to the time differences and/or the relationships. The target wide table may include information associated with a plurality of fields that is stored in sub-tables at the beginning. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the user terminal 130, the service provider terminal 140, the storage 150) may send information and/or data to another component(s) in the on-demand service system 100 via the network 120. For example, the server 110 may access and/or obtain a plurality of sub-tables associated with a plurality of historical orders from the storage 150 via the network 120. As another example, the server 110 may transmit a target wide table including information associated with the plurality of historical orders to the storage 150 via the network 120.

In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

The user terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, an onboard built-in television, a built-in tablet, etc. In some embodiments, the user terminal 130 may include a signal transmitter and a signal receiver configured to communicate with a positioning system for locating the position of the passenger and/or the user terminal 130. In some embodiments, the positioning system may be a global positioning system (GPS), a global navigation satellite system (GLONASS), a compass navigation system (COMPASS), a BeiDou navigation satellite system, a Galileo positioning system, a quasi-zenith satellite system (QZSS), etc.

In some embodiments, the user terminal 130 may be owned by a passenger. In some embodiments, the user terminal 130 may be owned by someone other than the passenger. For example, an owner A of the user terminal 130 may use the user terminal 130 to send a service request for a passenger B, and/or receive a service confirmation and/or information or instructions from the server 110. It should be understood that, in some embodiments, "passenger" and "user terminal" may be used interchangeably, and "driver" and "service provider terminal" may be used interchangeably.

In some embodiments, the service provider terminal 140 may include a plurality of service provider terminals 140-1, 140-2, . . . , 140-n. In some embodiments, the service provider terminal 140 may be similar to, or the same device as the user terminal 130. In some embodiments, the service provider terminal 140 may be customized to implement the online transportation service. In some embodiments, the service provider terminal 140 and the user terminal 130 may be configured with a signal transmitter and a signal receiver to receive position information of the service provider terminal 140 and the user terminal 130 from a positioning system.

In some embodiments, the service provider terminal 140 may be used by a driver. In some embodiments, the service provider terminal 140 may be used by someone other than the driver. For example, a user C of the service provider terminal 140 may use the service provider terminal 140 to receive a service request for a driver D, and/or information or instructions from the server 110. In some embodiments, a driver may be assigned to use one of the service provider terminal 140 for at least a certain period of time, for example, a day, a week, a month, or a year, etc. In some other embodiments, a driver may be assigned to use one of the service provider terminal 140 on a random basis. For example, when a driver is available to provide an on-demand service, he/she may be assigned to use a driver terminal that receives the earliest request and a vehicle that is recommended to perform the type of on-demand service. In some embodiments, the service provider terminal 140 may be associated with one or more drivers (e.g., a night-shift driver, a day-shift driver, or a driver pool by a random shifting).

The storage 150 may store data and/or instructions. The data may include data related to a plurality of historical orders, data related to a plurality of users, data related to a plurality of drivers, data related to the external environment, data related to a plurality of sub-tables, etc. The data related to the historical orders may include historical start locations, historical start time points, historical dates, historical destinations, historical order types, historical bills, historical routes, etc. The data related to the users may include user profiles. The data related to the drivers may include driver profiles. The data related to the external environment may include weather conditions, road conditions, etc. The data related to the sub-tables may include basic sub-tables, order tables, business tables, etc. A basic sub-table may include a plurality of fields associated with basic information of a user and/or a driver, for example, an identity, a gender, an occupation, an age. An order sub-table may include a plurality of fields associated with a specific order type (e.g., an express order, a taxi order), for example, the number of orders corresponding to a specific order type, a start time point, a start location, a coupon status. A business sub-table may include a plurality of fields associated with a plurality of order types, for example, the number of orders corresponding to each order type, a ratio of the number of orders corresponding to each order type to the total number of orders.

In some embodiments, the storage 150 may store data obtained from the user terminal 130 and/or the service provider terminal 140. For example, the storage 150 may store order information associated with the user terminal 130. In some embodiments, the storage 150 may store data and/or instructions that the server 110 may execute. The instructions may be executed to provide the on-demand services described in the present disclosure, generate a target wide table based on a plurality of sub-tables, etc.

In some embodiments, storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, one or more components in the on-demand service system 100 may access the data or instructions stored in the storage 150 via the network 120. In some embodiments, the storage 150 may be directly connected to the server 110 as a backend storage.

In some embodiments, one or more components in the on-demand service system 100 (e.g., the server 110, the user terminal 130, the service provider terminal 140) may have permissions to access the storage 150. In some embodiments, one or more components in the on-demand service system 100 may read and/or modify the information related to the passenger, the driver, and/or the vehicle when one or more conditions are met. For example, the server 110 may read and/or modify one or more passengers' user profile after an on-demand service order is completed.

In some embodiments, information exchanging between one or more components of the on-demand service system 100 may be initiated automatically. For example, the information exchanging may be initialed at a preset time point (e.g., 0:00 a.m.), in a preset frequency (e.g., every hour), etc. As another example, the information exchanging may be initiated manually, for example, by an operator.

One of ordinary skill in the art would understand that when an element of the on-demand service system 100 performs, the element may perform through electrical signals and/or electromagnetic signals. For example, when a user terminal 130 processes a task, such as determining time differences of generation time points of a plurality of tables, generating a target wide table, the user terminal 130 may operate logic circuits in its processor to process such task. When the user terminal 130 sends out a plurality of historical orders to the server 110, a processor of the user terminal 130 may generate electrical signals encoding the plurality of historical orders. The processor of the user terminal 130 may then send the electrical signals to an output port. If the user terminal 130 communicates with the server 110 via a wired network, the output port may be physically connected to a cable, which may further transmit the electrical signal to an input port of the server 110. If the user terminal 130 communicates with the server 110 via a wireless network, the output port of the user terminal 130 may be one or more antennas, which convert the electrical signals to electromagnetic signals. Similarly, a service provider terminal 140 may process a task through operation of logic circuits in its processor, and receive an instruction and/or service order from the server 110 via electrical signals or electromagnet signals. Within an electronic device, such as the user terminal 130, the service provider terminal 140, and/or the server 110, when a processor thereof processes an instruction, sends out an instruction, and/or performs an action, the instruction and/or action is conducted via electrical signals. For example, when the processor retrieves a plurality of sub-tables associated with a plurality of fields from a storage medium (e.g., the storage 150), it may send out electrical signals to a reading device of the storage medium, which may read structured data in the storage medium. The structured data may be transmitted to the processor in the form of electrical signals via a bus of the electronic device. Here, an electrical signal refers to one electrical signal, a series of electrical signals, and/or a plurality of discrete electrical signals.

Figure 2:
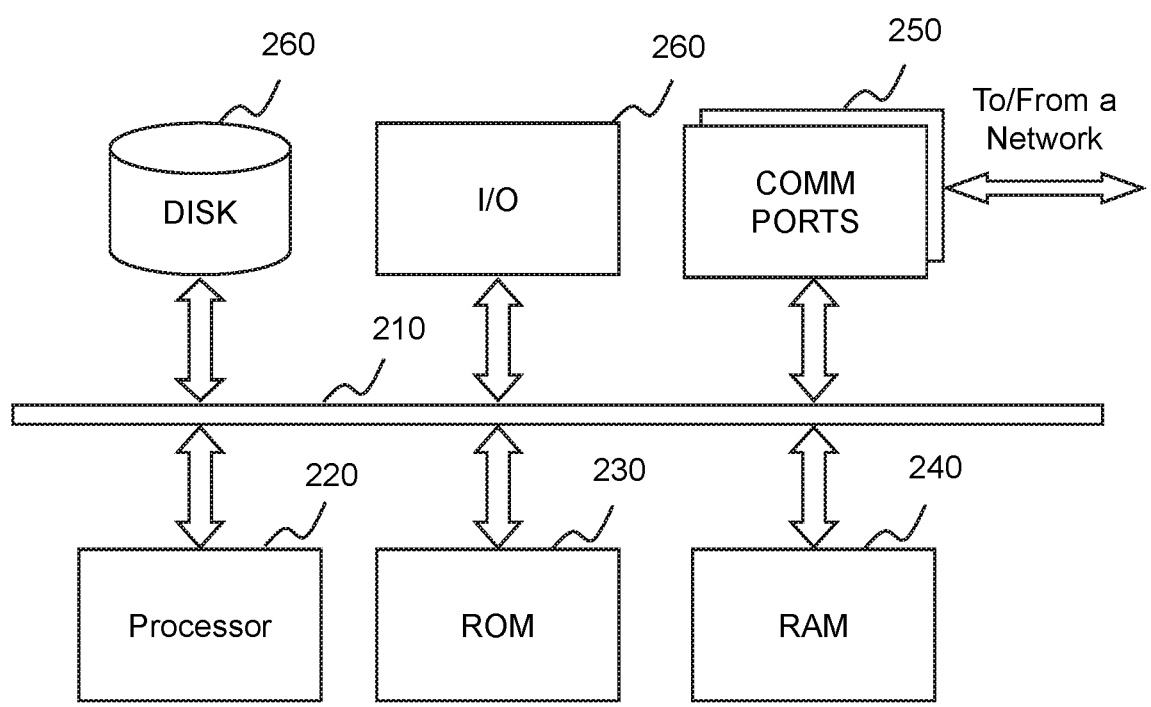
FIG. 2 illustrates an exemplary computing device on which the on-demand service system can be implemented, according to some embodiments of the present disclosure.

FIG. 2 illustrates an exemplary computing device 200 on which the on-demand service system 100 can be implemented, according to some embodiments of the present disclosure.

The computing device 200 may be a general purpose computer or a special purpose computer. Both may be used to implement an on-demand system of the present disclosure. The computing device 200 may be used to implement any component of the service as described herein. For example, the processing engine 112 of the server 110 may be implemented on the computing device 200, via its hardware, software program, firmware, or a combination thereof. Although only one such computer is shown for convenience, the computer functions related to the service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read-only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O component 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
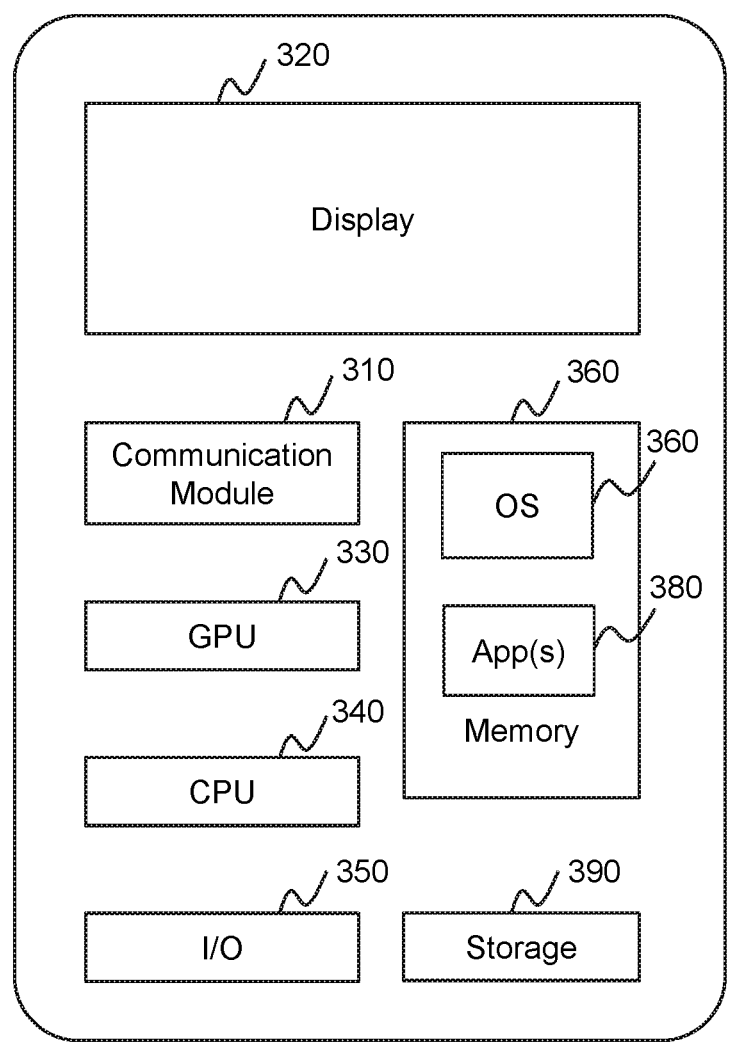
FIG. 3 illustrates an exemplary mobile device on which the on-demand service can be implemented, according to some embodiments of the present disclosure.

FIG. 3 illustrates an exemplary mobile device on which the on-demand service can be implemented, according to some embodiments of the present disclosure.

As illustrated in FIG. 3, the mobile device 300 may include a communication module 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for transmitting, receiving and presenting information relating to a service order (e.g., a plurality of candidate destinations associated with a user) from the processing engine 112 and/or the storage 150. User interactions with the information stream may be achieved via the I/O 350 and provided to the processing engine 112 and/or other components of the on-demand service system 100 via the network 120.

Figure 4:
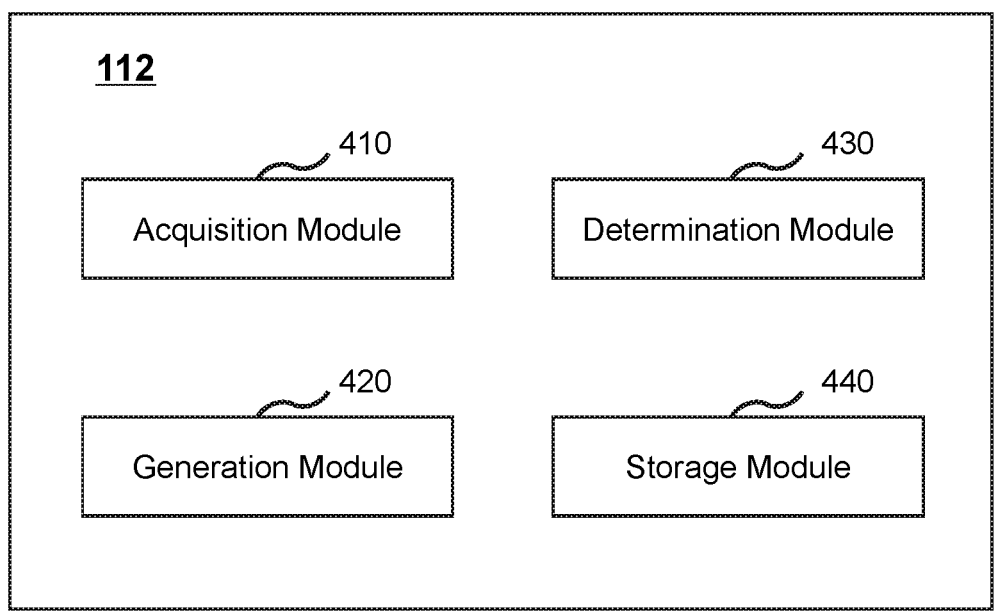
FIG. 4 illustrates an exemplary processing engine, according to some embodiments of the present disclosure.

FIG. 4 illustrates an exemplary processing engine 112 according to some embodiments of the present disclosure. The processing engine 112 of the server 110 may include an acquisition module 410, a generation module 420, a determination module 430, and a storage module 440. One or more modules in the processing engine 112 may be implemented by at least one processor, such as the processor 220.

In some embodiments, the acquisition module 410 may obtain a plurality of sub-tables. As used in the present disclosure, a sub-table may include information that is associate with one or more (at least one) field of a target wide table. A target wide table may include information of a number of fields. A field may include information related to features such as but not limited to an identity, a gender, an age, an occupation, the total number of orders, the number of orders corresponding to each order type, a start time point, a start location, a bill, a coupon status, and the like.

In some embodiments, a sub-table may include new/updated information that has been collected and/or acquired by an on-line platform, for example, the on-demand service system 100. The new/updated information refers to information generated in a previous period—such information may include information related to certain features of the target wide table and corresponding to activities/persons/objects in the previous period, for example, yesterday, half a day before, etc. Here, a previous period refers to a period of time, predetermined or not, before the time point when the entire sub-table is created and obtained by a processing engine 112 (e.g., the acquisition module 410). Merely by way of example, a sub-table obtained by the acquisition module 410 at 00:15 on Jul. 7, 2017 may include information generated on Jul. 6, 2017—corresponding to activities/persons/objects on Jul. 6, 2017, which is associated with one or more fields of a target wide table.

In some embodiments, a sub-table is obtained directly with data collection and/or acquisition, without combination and/or processing of other tables. In some embodiments, a sub-table may be of various types due to having different fields or information related to same or overlapping fields but for different time periods. For example, a sub-table may be a basic sub-table, an order sub-table, a business sub-table, etc.

In some embodiments, the acquisition module 410 may obtain the plurality of sub-tables according to the generation time points of the plurality of sub-tables. A generation time point may refer to a time point when the sub-table is generated completely. Merely by way of example, the acquisition module 410 may obtain a sub-table at or closely after the generation time point of the sub-table. Since the generation time points of two or more sub-tables may be the same or different, the acquisition module 410 may obtain the two or more sub-tables at the same time point or different time points. In some embodiments, when the generation time points of two or more sub-tables are the same, the acquisition module 410 may obtain the two or more sub-tables at the same time point. Otherwise, the acquisition module 410 may obtain the two or more sub-tables at different time points. It would also be possible, however, that the acquisition of a sub-table is purposefully delayed so that two or more sub-tables can be obtained at the same time point or close to one another.

Alternatively or optionally, the acquisition module 410 may obtain the plurality of sub-tables according to time points of using the plurality of sub-tables during the generation of the target wide table. Merely by way of example, the acquisition module 410 may obtain a sub-table a time period (e.g., 30 min) before the time point of using the sub-table during the generation of the target wide table. Since the time points of using two or more sub-tables during the generation of the target wide table may be the same or different, the acquisition module 410 may obtain the two or more sub-tables at the same time point or different time points. In some embodiments, when the time points of using two or more sub-tables during the generation of the target wide table are the same, the acquisition module 410 may obtain the two or more sub-tables at the same time point. Otherwise, the acquisition module 410 may obtain the two or more sub-tables at different time points. It would also be possible, however, that the acquisition of a sub-table is purposefully delayed so that two or more sub-tables can be obtained at the same time point or close to one another.

In some embodiments, the generation module 420 may generate a plurality of intermediate tables. As used in the present disclosure, an intermediate table may refer to a table except for the sub-table and the target wide table during the generation of the target wide table. Similar to a sub-table, an intermediate table may correspond to a generation time point. In some embodiments, an intermediate table may be generated directly or indirectly based on one or more of the plurality of sub-tables. In other words, an intermediate table may be generated based on information acquired directly or indirectly from one or more of the plurality of sub-tables. For example, an intermediate table generated based on information acquired directly from a first sub-table and a second sub-table, is generated directly based on one or more of the plurality of sub-tables (i.e., the first sub-table and the second sub-table). As another example, an intermediate table generated based on information acquired directly from another intermediate table who is generated based on information acquired directly from a first sub-table and a second sub-table, is generated indirectly based on one or more of the plurality of sub-tables (i.e., the first sub-table and the second sub-table).

In some embodiments, at least two of the plurality of intermediate tables may be generated in parallel. Here, "in parallel" refers to the generation of at least two of the plurality of intermediate tables may be conducted independently and simultaneously. Alternatively or optionally, the generation module 420 may generate two or more intermediate tables in series. Here, "in series" refers to the generation of the two or more intermediate tables may be conducted dependently. In other words, the generation of one intermediate table may depend on the generation of the other intermediate table(s).

In some embodiments, at least one intermediate table may be generated before one or more of the sub-tables are obtained. It should be understood that the at least one intermediate table is not generated directly or indirectly based on the one or more of the sub-tables. In certain embodiments, while the sub-tables are being obtained, the generation module 420 has begun to generate the intermediate tables (e.g., closely after the first two or more of the sub-tables have been obtained). In certain embodiments, a substantial number of intermediate tables have been generated before all the sub-tables are obtained. In certain embodiments, a substantial percentage (e.g., 20%, 30%, 40%, 50%, 60%, 70%, 70%, 80%, or 90%) of intermediate tables have been generated before all the sub-tables are obtained. In other words, the acquisition module 410 and the generation module 420 may execute operations simultaneously or successively.

In some embodiments, a determination module 430 is configured to determine the target wide table based on the plurality of intermediate tables.

In some embodiments, the plurality of sub-tables, the plurality of intermediate tables, and the target wide table may form a multi-level structure. The multi-level structure may include a base layer, one or more intermediate layers, and a top layer. The base layer may include a plurality of sub-tables. The intermediate layer may include one or more intermediate tables. The top layer may include the target wide table.

As illustrated above, an intermediate table may be generated directly or indirectly based on one or more of a plurality of sub-tables obtained by the acquisition module 410. In some embodiments, the generation module 420 may generate an intermediate table at the one or more intermediate layers based on at least two of sub-tables and/or other intermediate tables. In certain embodiments, an intermediate table generated directly based on one or more of a plurality of sub-tables, may be generated based on only sub-tables at the base layer. In certain embodiments, an intermediate table generated indirectly based on one or more of a plurality of sub-tables, may be generated based on one or more sub-tables at the base layer and one or more other intermediate tables, or based on only other intermediate tables. The other intermediate tables may be at a different intermediate layer from the generated intermediate table. To be specific, the other intermediate tables may be at a lower intermediate layer than a higher intermediate layer to which the generated intermediate table belongs. It should be understood that, a lower intermediate layer and a higher intermediate layer are not specific intermediate layers, and they are used for illustration purposes that intermediate tables at a lower intermediate layer may be generated earlier than intermediate tables at a higher layer. The number of layers between the higher intermediate layer and the lower intermediate layer may be zero, one, or other positive integers.

In some embodiments, the generation module 420 may generate an intermediate table at the first intermediate layer in the multi-level structure generated based on at least two sub-tables at the base layer. In some embodiments, the generation module 420 may generate an intermediate table at the second, third, . . . , or last intermediate layer in the multi-level structure based on at least two sub-tables at the base layer. Alternatively, in some embodiments, the generation module 420 may generate an intermediate table at the second, third, . . . , or last intermediate layer in the multi-level structure based on at least two intermediate tables at a lower intermediate layer. The at least two intermediate tables may be at the same lower intermediate layer or at different lower intermediate layers. For example, the generation module 420 may generate an intermediate table at the second intermediate layer based on three intermediate tables at the first intermediate layer. As another example, the generation module 420 may generate an intermediate table at the third intermediate layer based on two intermediate tables at the first intermediate layer. Alternatively, in some embodiments, the generation module 420 may generate an intermediate table at the second, third, . . . , or last intermediate layer in the multi-level structure based on at least one intermediate table at a lower intermediate layer and at least one sub-table at the base layer. For example, the generation module 420 may generate an intermediate table at the second intermediate layer based on one intermediate table at the first intermediate layer and one sub-table at the base layer. As another example, the generation module 420 may generate an intermediate table at the third intermediate layer based on one intermediate table at the first intermediate layer and two sub-tables at the base layer.

In some embodiments, the generation module 420 may generate the target wide table at the top layer in the multi-level structure based on all intermediate tables at the last intermediate layer in the multi-level structure, or a combination of all intermediate tables at the last intermediate layer and at least one sub-table at the base layer.

Figure 6:
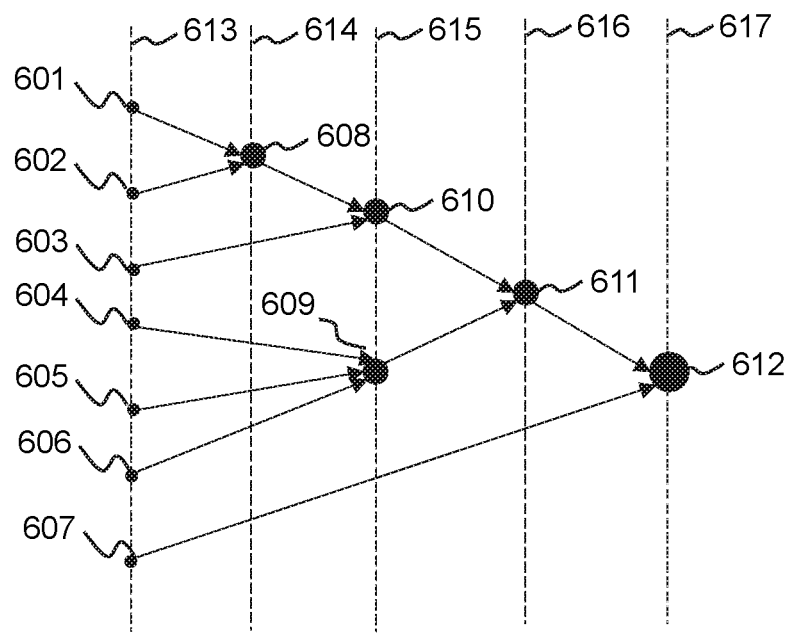
FIG. 6 illustrates an exemplary multi-level structure of generating a wide table according to some embodiments of the present disclosure.

FIG. 6 illustrates an exemplary multi-level structure 600 according to some embodiments in the present disclosure. The multi-level structure 600 may illustrate the generation of the target wide table and form a directed acyclic graph (DAG). It should be noted that the multi-level structure 600 is for illustration purposes only and not intended to be limiting.

As shown in FIG. 6, and for illustration purposes only, the multi-level structure 600 includes seven sub-tables (i.e., 601, 602, . . . , 607) represented by small points, four intermediate tables (i.e., 608, 609, . . . , 611) represented by mid-sized points, a target wide table (i.e., 612) represented by a big point, and five layers (i.e., 613, 614, . . . , 617) represented by dotted lines. The seven sub-tables form a base layer, i.e., the base layer 613. The four intermediate tables form three intermediate layers, i.e., the intermediate layer 614, the intermediate layer 615, and the intermediate layer 616. The target wide table 612 forms a top layer, i.e., the top layer 617. The multi-level 600 may further include eleven arrows. The direction of an arrow may point from a table that is used/processed/combined to a table that is generated. For example, the arrow between the sub-table 603 and the intermediate table 610 may mean that the intermediate table 610 (i.e., a table that is generated) is generated based at least in part on the sub-table 603 (i.e., a table that is used/processed/combined).

In some embodiments, the acquisition module 410 may obtain the seven sub-tables at the base layer 613 according to generation time points of the seven sub-tables. As illustrated elsewhere in the present disclosure, the generation time points of the seven sub-tables at the base layer 613 may be the same or different. For example, generation time points of the sub-table 601 and the sub-table 602 may be the same. Accordingly, the acquisition module 410 may obtain the sub-table 601 and the sub-table 602 at the same time point (e.g., at or closely after the same time point). As another example, generation time points of the sub-table 601 and the sub-table 607 may be different. Accordingly, the acquisition module 410 may obtain the sub-table 601 and the sub-table 607 at different time points (e.g., at or closely after the different time points respectively).

In some embodiments, the acquisition module 410 may obtain the seven sub-tables at the base layer 613 according to time points of using the seven sub-tables during the generation of the target wide table 612. As illustrated elsewhere in the present disclosure, time points of using the seven sub-tables at the base layer 613 may be the same or different. For example, the sub-table 601 and the sub-table 602 may be used to generate the intermediate table 608 at the same time point, thus the time points of using the sub-table 601 and the sub-table 602 may be the same. Accordingly, the acquisition module 410 may obtain the sub-table 601 and the sub-table 602 at the same time point. As another example, the sub-table 601 and the sub-table 607 may be used at different time points. The sub-table 601 may be used to generate the intermediate table 608 at the intermediate layer 614, while the sub-table 607 may be used to generate the target wide table 612 at the top layer 617. Accordingly, the acquisition module 410 may obtain the sub-table 601 and the sub-table 607 at different time points.

As shown in FIG. 6, and for illustration purposes only, the generation module 420 may generate an intermediate table at an intermediate layer (e.g., 608, 609, . . . , 611) directly or indirectly based on the seven sub-tables (i.e., 601, 602, . . . , 607). To be specific, the generation module 420 may generate the intermediate table based on at least two sub-tables at the base layer, at least one intermediate table at a lower intermediate layer and at least one sub-table at the base layer, or at least two intermediate tables at the same lower intermediate layer or two different lower intermediate layers. For example, the generation module 420 may generate the intermediate table 608 at the intermediate layer 614 based on the sub-table 601 and the sub-table 602 at the base layer 613. As another example, the generation module 420 may generate the intermediate table 610 at the intermediate layer 615 (i.e. a higher intermediate layer) based on the intermediate table 608 at the intermediate layer 614 (i.e. a lower intermediate layer) and the sub-table 603 at the base layer 613. As still another example, the generation module 420 may generate the intermediate table 611 at the intermediate layer 616 (i.e. a higher intermediate layer) based on the intermediate table 610 and the intermediate table 609 at the intermediate layer 615 (i.e. the same lower intermediate layer).

In some embodiments, the determination module 430 may determine the target wide table 612 at the top layer 617 based on the intermediate table 611 at the intermediate layer 616 and the sub-table 607 at the base layer 613.

In some embodiments, the generation module 420 may generate an intermediate table based on (1) at least two sub-tables, (2) at least one sub-table and one intermediate table, or (3) at two intermediate tables, wherein the generation time points of these tables are similar. For brevity purposes, at least two of sub-tables and other intermediate tables in the present disclosure may refer to the description herein. In other words, time differences among generation time points corresponding to the at least two of sub-tables and other intermediate tables are less than a threshold. Here, a threshold refers to a period of time, which is determined automatically or manually, for example, by an operator. The time differences among generation time points corresponding to the at least two of sub-tables and other intermediate tables may include time differences among generation time points corresponding to at least two intermediate tables at the same lower intermediate layer or two different lower intermediate layers, time differences among at least one intermediate table at a lower intermediate layer and at least one sub-table at a base layer, or time differences among at least two sub-tables at a base layer. Referring to FIG. 6, if the sub-table 601 is generated at 0:01, a.m. and the sub-table 602 is generated at 0:02, a.m., the generation module 420 may determine that generation time points of the two sub-tables are similar, i.e., the time difference between the generation time points of the two sub-tables is less than the threshold (e.g., two minutes). Then, the generation module 420 may generate the intermediate table 608 based on the sub-table 601 and the sub-table 602. Similarly, the generation module 420 may generate the intermediate table 610 based on the sub-table 603 and the intermediate table 608 whose generation time points are similar, and generate the intermediate table 611 based on the intermediate table 609 and the intermediate table 610 whose generation time points are similar.

In some embodiments, the generation module 420 may generate an intermediate table based on at least two of sub-tables and other intermediate tables among which relationships exist. The relationships among the at least two of sub-tables and other intermediate tables may include relationships among at least two intermediate tables at the same lower intermediate layer or two different lower intermediate layers, relationships among at least one intermediate table at a lower intermediate layer and at least one sub-table at a base layer, or relationships among at least two sub-tables at a base layer. The relationships among the at least two of sub-tables and other intermediate tables may be determined based on one or more fields of the target wide table. Merely by way of example, referring to FIG. 6, if the target wide table 612 includes a field, for example, the total number of orders, the intermediate table 611 on the last intermediate layer 616 includes the same field. To generate the intermediate table 611, the generation module 420 may determine whether relationships among the sub-table 607, the intermediate table 609, and the intermediate table 610 exist. As illustrated elsewhere in the present disclosure, the total number of orders may be determined by a summation of the number of orders corresponding to each order type. If the intermediate table 609 includes a field representing the number of taxi orders, the intermediate table 610 includes a field representing the number of express orders, and the sub-table 607 does not include a field representing the number of orders corresponding to a specific order type (e.g., an express order, a taxi order), the generation module 420 may determine that only the relationship between the intermediate table 609 and the intermediate table 610 exists. Then, the generation module 420 may generate the intermediate table 611 based on the intermediate table 609 and the intermediate table 610.

In some embodiments, the generation module 420 may generate an intermediate table based on at least two of sub-tables and other intermediate tables whose generation time points are similar and among which relationships exist. Also referring to FIG. 6, if the intermediate table 611 includes a field representing the total number of orders, the intermediate table 609 includes a field representing the number of taxi orders, and the intermediate table 610 includes a field representing the number of express orders, the generation module 420 may determine that relationship between the intermediate table 609 and the intermediate table 610 exists. At the same time, if the intermediate table 609 is generated at 1:01, a.m. and the intermediate table 610 is generated at 1:02, a.m., the generation module 420 may determine that the time difference between generation time points of the intermediate table 609 and the intermediate table 610 is less than a threshold (e.g., two minutes). The generation module 420 may generate the intermediate table 611 based on the intermediate table 609 and the intermediate table 610.

In some embodiments, the generation module 420 may generate an intermediate table by combining at least two of sub-tables and other intermediate tables directly or indirectly. For example, the generation module 420 may generate the intermediate table by combining at least two of sub-tables and other intermediate tables whose generation time points are similar. As another example, the generation module 420 may generate the intermediate table by combining at least two of sub-tables and other intermediate tables among which relationships exist. As still another example, the generation module 420 may generate the intermediate table by combining at least two of sub-tables and other intermediate tables whose generation time points are similar and among which relationships exist. In some embodiments, an intermediate table may include one or more fields that associate with at least one field of the target wide table. The one or more fields of the intermediate table may be the same as or different from fields of the at least two of sub-tables and other intermediate tables. In some embodiments, when the one or more fields of the intermediate table are the same as the fields of the at least two of sub-tables and other intermediate tables, the generation module 420 may generate the intermediate table by combining the at least two of sub-tables and other intermediate tables directly. Merely by way of example, an intermediate table includes four fields, namely, identity, age, gender, and occupation. A first sub-table includes two fields, namely, identity and age. A second sub-table includes two fields, namely, gender and occupation. The intermediate table may be generated based on the first sub-table and the second sub-table. The generation module 420 may generate the intermediate table by combining the first sub-table and the second sub-table directly. In some embodiments, when at least one of the one or more fields of the intermediate table is different from fields of the at least two of sub-tables and other intermediate tables (i.e., a new field exists in the generated intermediate table), the generation module 420 may generate the intermediate table by combining the at least two of sub-tables and other intermediate tables indirectly. To be specific, the generation module 420 may process information of the at least two of sub-tables and other intermediate tables according to the one or more fields of the intermediate table. The processing may produce a new field (e.g., a target field in a target table) based on one or more fields in tables to be processed. The processing may include mathematical calculation (e.g., summation). Then, the generation module 420 may generate the intermediate table based at least in part on the processed information. Merely by way of example, an intermediate table includes two fields represented by identity and the total number of orders. A first sub-table includes two fields represented by identity and the number of express orders. A second sub-table includes two fields represented by identity and the number of taxi orders. If an order type includes a taxi order and an express order only, the generation module 420 may sum the number of express orders in the first sub-table and the number of taxi orders in the second sub-table to determine the total number of orders. Then the generation module 420 may generate the intermediate table based at least in part on the summation.

In some embodiments, the generation module 420 may generate at least two intermediate tables in parallel or in series. Referring to FIG. 6, and for illustration purposes only, according to directions of arrows in the multi-level structure 600, intermediate tables on the same intermediate layer may be generated in parallel. For example, the intermediate table 609 and the intermediate table 610 at the intermediate layer 615 may be generated in parallel. The intermediate tables on different intermediate layers may be generated in parallel or in series. For example, the intermediate table 608 at the intermediate layer 614 and the intermediate table 609 at the intermediate layer 615 may be generated in parallel. As another example, the intermediate table 610 at the intermediate layer 615 and the intermediate table 611 at the intermediate layer 616 may be generated in series.

In some embodiments, the determination module 430 may determine a target table based on a plurality of intermediate tables. The determination module 430 may determine the target wide table based on all intermediate tables at the last intermediate layer, or a combination of the all intermediate tables at the last intermediate layer and at least one other table (e.g., a sub-table, an intermediate table at other intermediate layers except for the last intermediate layer). Referring to the multi-level structure 600 in FIG. 6, the determination module 430 may determine the target wide table 612 based on the intermediate table 611 at the intermediate layer 616 and the sub-table 607 at the base layer 613. It should be understand that, when the target wide table is determined only based on all intermediate tables at the last intermediate layer, the number of all intermediate tables at the last intermediate layer may be two or more.

In some embodiments, the determination module 430 may determine a target wide table by combining all intermediate tables at the last intermediate layer, or combining all intermediate tables at the last intermediate layer and at least one other table. Similar to the combination with respect to the generation of an intermediate table, the combination may be performed directly or indirectly.

The storage module 440 may store a plurality of tables. A table may include a sub-table, an intermediate table, and a target table. The storage module 440 may be the same as the storage 150. In some embodiments, the storage module 440 may include a mass storage, removable storage, a volatile read-and-write memory, a read-only memory (ROM), or the like, or any combination thereof.

The acquisition module 410, the generation module 420, the determination module 430, and the storage module 440 in the processing engine 112 may be connected to or communicate with each other via a wired connection, a wireless connection, or any combination thereof. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

In some embodiments, two or more of the acquisition module 410, the generation module 420, the determination module 430, and the storage module 440 may be combined as a single module. For example, the generation module 420 may be integrated with the determination module 430 as a single module. The single module may determine a plurality of intermediate tables and a target table. In some embodiments, the processing engine 112 may further include a communication module. The communication module may be configured to transmit information (e.g., a target wide table) to other components in the on-demand service system 100.

Figure 5:
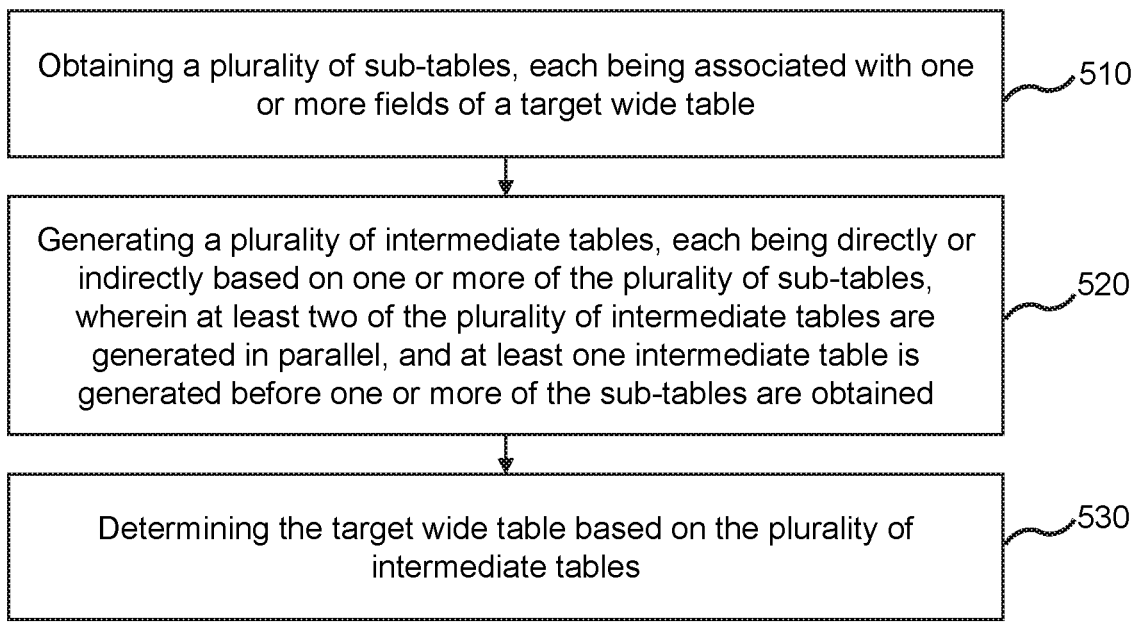
FIG. 5 illustrates an exemplary process for generating a wide table according to some embodiments of the present disclosure.

FIG. 5 illustrates an exemplary process for generating a wide table according to some embodiments of the present disclosure. The process 500 may be implemented as a set of instructions in a non-transitory storage medium of the server 110 of the on-demand service system 100. The processor 220 of the server 110 may execute the set of instructions and may accordingly perform the steps in the process 500.

The operations of the illustrated process 500 presented below are intended to be illustrative and not limiting. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the acquisition module 410 may obtain a plurality of sub-tables. In some embodiments, the acquisition module 410 may obtain the plurality of sub-tables according to generation time points of the plurality of sub-tables. For example, the acquisition module 410 may obtain the plurality of sub-tables at or closely after the generation time points of the plurality of sub-tables respectively. Since the generation time points of the plurality of sub-tables may be the same or different, the acquisition module 410 may obtain the plurality of sub-tables at the same time point or different time points.

Alternatively or optionally, the acquisition module 410 may obtain the plurality of sub-tables according to time points of using the plurality of sub-tables during the generation of the target wide table. For example, the acquisition module 410 may obtain the plurality of sub-tables a time period (e.g., 30 min) before time points of using the plurality of sub-tables during the generation of the target wide table respectively. Since the time points of using the plurality of sub-tables during the generation of the target wide table may be the same or different, the acquisition module 410 may obtain the plurality of sub-tables at the same time point or different time points. Details regarding the obtaining of a sub-table may be found elsewhere in the present disclosure. See, e.g., FIGS. 4 and 6, and the description thereof.

In 520, the generation module 420 may generate a plurality of intermediate tables, each being directly or indirectly based on one or more of the plurality of sub-tables. In some embodiments, the generation module 420 may generate at least one intermediate table before one or more of the sub-tables are obtained. In some embodiments, the generation module 420 may generate an intermediate table based on at least two of sub-tables and other intermediate tables whose generation time points are similar, at least two of sub-tables and other intermediate tables among which relationships exist, or a combination thereof. In certain embodiments, the generation module 420 may generate the intermediate table by combining the at least two of sub-tables and other intermediate tables directly or indirectly. In certain embodiments, the generation module 420 may generate at least two intermediate tables in parallel, in series, or a combination thereof. Details regarding the generation of an intermediate table may be found elsewhere in the present disclosure. See, e.g., FIGS. 4 and 6, and the description thereof.

In 530, the determination module 430 may determine the target wide table based on the plurality of intermediate tables. In some embodiments, the determination module 430 may determine the target wide table based on all intermediate tables at the last intermediate layer, or a combination of the all intermediate tables at the last intermediate layer and at least one other table (e.g., a sub-table, an intermediate table at other intermediate layers except for the last intermediate layer). Similar to the generation of an intermediate table, the determination module 430 may determine the target wide table by combining the all intermediate tables at the last intermediate layer, or the combination of the all intermediate tables at the last intermediate layer and at least one other table directly or indirectly.

In some embodiments, the process 500 may further include additional steps. For example, the process 500 may further include transmitting the target wide table to other component (e.g., the storage 150) in the on-demand service system 100. The above description is merely for illustrative purposes. It should be noted that those skilled in the art may contemplate additional or alternative steps beside the steps described in FIG. 5.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more non-transitory computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter lies in less than all features of a single foregoing disclosed embodiment.

We claim:

1. A system for generating a target wide table associated with online transportation services, comprising:
   at least one storage device including a set of instructions; and
   at least one processor in communication with the at least one storage device, wherein when executing the set of instructions, the at least one processor is configured to cause the system to:
      obtain a plurality of sub-tables from the at least one storage device, each being associated with one or more fields of the target wide table to be generated, at least part of the plurality of sub-tables being obtained in a chronological order, wherein the plurality of sub-tables include:
         at least one sub-table generated based on basic information of passengers or drivers of the online transportation services, the basic information being obtained from passenger terminals or driver terminals via a wireless interface of the at least one processor; and
         at least one sub-table generated based on service information of the online transportation services, the service information being obtained, via the wireless interface, from the passenger terminals, the driver terminals, or the at least one storage device;
      generate a plurality of intermediate tables, each being directly or indirectly based on one or more of the plurality of sub-tables, wherein
         at least one of the plurality of intermediate tables is generated based on at least two of the plurality of sub-tables, and time differences among generation time points corresponding to the at least two of the plurality of sub-tables and other intermediate tables of the plurality of intermediate tables are less than a threshold;
         at least two of the plurality of intermediate tables are generated in parallel, and
         at least one intermediate table is generated before all the plurality of sub-tables are obtained; and
      generate the target wide table based on the plurality of intermediate tables.

2. The system of claim 1, wherein the plurality of sub-tables, the plurality of intermediate tables, and the target wide table form a multi-level structure.

3. The system of claim 2, wherein the multi-level structure is determined with:
   (a) relationships among the plurality of sub-tables and the plurality of intermediate tables;
   (b) relationships among generation time points of the plurality of sub-tables and the plurality of intermediate tables; or
   (c) a combination of (a) and (b).

4. The system of claim 3, wherein the multi-level structure includes one or more intermediate layers corresponding to the plurality of intermediate tables and a base layer corresponding to the plurality of sub-tables, wherein one of the plurality of intermediate tables is generated based on:
   at least two intermediate tables at a same lower intermediate layer or two different lower intermediate layers,
   at least one intermediate table at a lower intermediate layer and at least one sub-table at the base layer, or
   at least two sub-tables at the base layer.

5. The system of claim 4, wherein the time differences among the generation time points corresponding to the at least two intermediate tables at the same lower intermediate layer or two different lower intermediate layers, the time differences among the at least one intermediate table at the lower intermediate layer and the at least one sub-table at the base layer, or the time differences among the at least two sub-tables at the base layer are less than the threshold.

6. The system of claim 4, wherein the relationships among the at least two intermediate tables at the same lower intermediate layer or two different lower intermediate layers, the relationships among the at least one intermediate table at the lower intermediate layer and the at least one sub-table at the base layer, or the relationships among the at least two sub-tables at the base layer are associated with at least one field of the plurality of fields of the target wide table.

7. The system of claim 4, wherein to generate the plurality of intermediate tables, the at least one processor is further configured to cause the system to:
   combine the at least two intermediate tables at the same lower intermediate layer or two different lower intermediate layers, the at least one intermediate table at the lower intermediate layer and the at least one sub-table at the base layer, or at least two sub-tables at the base layer.

8. The system of claim 4, wherein to generate the at least one intermediate table, the at least one processor is further configured to cause the system to:
   process information associated with the at least two intermediate tables at the same lower intermediate layer or two different lower intermediate layers, the at least one intermediate table at the lower intermediate layer and the at least one sub-table at the base layer, or at least two sub-tables at the base layer.

9. A method for generating a target wide table associated with online transportation services implemented on a computing device having at least one processor, at least one computer-readable storage medium, and a communication platform connected to a network, comprising:
   obtaining a plurality of sub-tables from the at least one computer-readable storage medium, each being associated with one or more fields of the target wide table to be generated, at least part of the plurality of sub-tables being obtained in a chronological order, wherein the plurality of sub-tables include:
      at least one sub-table generated based on basic information of passengers or drivers of the online transportation services, the basic information being obtained from passenger terminals or driver terminals via a wireless interface of the at least one processor; and at least one sub-table generated based on service information of the online transportation services, the service information being obtained, via the wireless interface, from the passenger terminals, the driver terminals, or the at least one storage device;

generating a plurality of intermediate tables, each being directly or indirectly based on one or more of the plurality of sub-tables, wherein at least one of the plurality of intermediate table is generated based on at least two of the plurality of sub-tables, and time differences among generation time points corresponding to the at least two of the plurality of sub-tables and other intermediate tables of the plurality of intermediate tables are less than a threshold;

at least two of the plurality of intermediate tables are generated in parallel, and at least one intermediate table is generated before all the plurality of sub-tables are obtained; and generating the target wide table based on the plurality of intermediate tables.

10. The method of claim 9, wherein the plurality of sub-tables, the plurality of intermediate tables, and the target wide table form a multi-level structure.

11. The method of claim 10, wherein the multi-level structure is determined with:

(a) relationships among the plurality of sub-tables and the plurality of intermediate tables;

(b) relationships among generation time points of the plurality of sub-tables and the plurality of intermediate tables; or (c) a combination of (a) and (b).

12. The method of claim 11, wherein the multi-level structure includes one or more intermediate layers corresponding to the plurality of intermediate tables and a base layer corresponding to the plurality of sub-tables, wherein one of the plurality of intermediate tables is generated based on:

at least two intermediate tables at a same lower intermediate layer or two different lower intermediate layers, at least one intermediate table at a lower intermediate layer and at least one sub-table at the base layer, or at least two sub-tables at the base layer.

13. The method of claim 12, wherein the time differences among the generation time points corresponding to the at least two intermediate tables at the same lower intermediate layer or two different lower intermediate layers, the time differences among the at least one intermediate table at the lower intermediate layer and the at least one sub-table at the base layer, or the time differences among the at least two sub-tables at the base layer are less than the threshold.

14. The method of claim 12, wherein the relationships among the at least two intermediate tables at the same lower intermediate layer or two different lower intermediate layers, the relationships among the at least one intermediate table at the lower intermediate layer and the at least one sub-table at the base layer, or the relationships among the at least two sub-tables at the base layer are associated with at least one field of the plurality of fields of the target wide table.

15. The method of claim 12, wherein generating the plurality of intermediate tables comprises:

combining the at least two intermediate tables at the same lower intermediate layer or two different lower intermediate layers, the at least one intermediate table at the lower intermediate layer and the at least one sub-table at the base layer, or at least two sub-tables at the base layer.

16. The method of claim 12, wherein generating the at least one intermediate table comprises:

processing information associated with the at least two intermediate tables at the same lower intermediate layer or two different lower intermediate layers, the at least one intermediate table at the lower intermediate layer and the at least one sub-table at the base layer, or at least two sub-tables at the base layer.

17. A non-transitory computer readable medium embodying a computer program product, the computer program product comprising instructions configured to cause a computing system to:

obtain a plurality of sub-tables from at least one storage device, each being associated with one or more fields of a target wide table to be generated, at least part of the plurality of sub-tables being obtained in a chronological order, wherein the plurality of sub-tables include:

at least one sub-table generated based on basic information of passengers or drivers of online transportation services, the basic information being obtained from passenger terminal s or driver terminals via a wireless interface of the at least one processor; and at least one sub-table generated based on service information of the online transportation services, the service information being obtained, via the wireless interface, from the passenger terminals, the driver terminals, or the at least one storage device;

generate a plurality of intermediate tables, each being directly or indirectly based on one or more of the plurality of sub-tables, wherein at least one of the plurality of intermediate table is generated based on at least two of the plurality of sub-tables, and time differences among generation time points corresponding to the at least two of the plurality of sub-tables and other intermediate tables of the plurality of intermediate tables are less than a threshold;

at least two of the plurality of intermediate tables are generated in parallel, and at least one intermediate table is generated before all the plurality of sub-tables are obtained; and generate the target wide table based on the plurality of intermediate tables.

18. The non-transitory computer readable medium of claim 17, wherein the plurality of sub-tables, the plurality of intermediate tables, and the target wide table form a multi-level structure.

19. The non-transitory computer readable medium of claim 18, wherein the multi-level structure is determined with:

(a) relationships among the plurality of sub-tables and the plurality of intermediate tables;

(b) relationships among generation time points of the plurality of sub-tables and the plurality of intermediate tables; or (c) a combination of (a) and (b).

20. The non-transitory computer readable medium of claim 19, wherein the multi-level structure includes one or more intermediate layers corresponding to the plurality of intermediate tables and a base layer corresponding to the plurality of sub-tables, wherein one of the plurality of intermediate tables is generated based on:

at least two intermediate tables at a same lower intermediate layer or two different lower intermediate layers, at least one intermediate table at a lower intermediate layer and at least one sub-table at the base layer, or
at least two sub-tables at the base layer.

\* \* \* \* \*